(12) United States Patent
Sakthikumar et al.

(10) Patent No.: US 8,402,262 B2
(45) Date of Patent: *Mar. 19, 2013

(54) ENABLING A HETEROGENEOUS BLADE ENVIRONMENT

(75) Inventors: Palsamy Sakthikumar, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/966,607

(22) Filed: Dec. 13, 2010

(65) Prior Publication Data

US 2011/0083005 A1   Apr. 7, 2011

Related U.S. Application Data

(63) Continuation of application No. 11/888,160, filed on Jul. 31, 2007, now Pat. No. 7,873,846.

(51) Int. Cl.
*G06F 9/00* (2006.01)
*G06F 9/24* (2006.01)
*G06F 1/00* (2006.01)

(52) U.S. Cl. ................... 713/2; 713/1; 713/300
(58) Field of Classification Search .................. 713/1, 2, 713/300
See application file for complete search history.

(56) References Cited

U.S. PATENT DOCUMENTS

| | | | | |
|---|---|---|---|---|
| 7,051,215 | B2 | 5/2006 | Zimmer et al. | 713/300 |
| 7,082,527 | B2 | 7/2006 | Zimmer et al. | 713/2 |
| 7,222,339 | B2 | 5/2007 | Rothman et al. | 717/168 |
| 7,353,415 | B2 | 4/2008 | Zaretsky et al. | 713/320 |
| 7,444,667 | B2 * | 10/2008 | Bulusu et al. | 726/1 |
| 7,461,274 | B2 | 12/2008 | Merkin | 713/300 |
| 2005/0015430 | A1 | 1/2005 | Rothman et al. | 709/201 |
| 2005/0028000 | A1 | 2/2005 | Bulusu et al. | 713/200 |
| 2005/0068888 | A1 | 3/2005 | Komarla et al. | 370/216 |
| 2005/0071623 | A1 | 3/2005 | Goud et al. | 713/100 |
| 2005/0138439 | A1 | 6/2005 | Rothman et al. | 713/300 |
| 2005/0216627 | A1 | 9/2005 | Goud et al. | 710/100 |
| 2006/0015781 | A1 | 1/2006 | Rothman et al. | 714/100 |
| 2006/0046311 | A1 | 3/2006 | Sun et al. | 436/518 |

* cited by examiner

*Primary Examiner* — Suresh Suryawanshi
(74) *Attorney, Agent, or Firm* — Trop, Pruner & Hu, P.C.

(57) ABSTRACT

In one embodiment, the present invention includes a method for receiving a request for power-up of a first blade of a chassis, enabling the first blade to power-up in a reduced boot mode and receiving a communication including characteristic information and policy information associated with the first blade, and analyzing the characteristic information and the policy information to determine a policy and a boot configuration for the first blade. Other embodiments are described and claimed.

18 Claims, 3 Drawing Sheets

ENABLING A HETEROGENEOUS BLADE ENVIRONMENT

This application is a continuation of U.S. patent application Ser. No. 11/888,160, filed Jul. 31, 2007 now U.S. Pat. No. 7,873,846, entitled "ENABLING A HETEROGENEOUS BLADE ENVIRONMENT," the content of which is hereby incorporated by reference.

BACKGROUND

In today's rack or blade server environments, typically all blades of the server are homogeneous resources. That is, each blade is generally of a same manufacturer and includes identical or similar components configured similarly. As such, a chassis management module (CMM) is manufactured by the same original equipment manufacturer (OEM) as the blades' OEM. Accordingly, there is no need to negotiate or convey policy with regard to the blade servers. As a result, current blade/rack topologies do not admit for seamless inoperability of heterogeneous computation blades.

In other words, blade systems are proprietary systems where compute resources are the same types and manufactured by the same vendors of the CMM. As such, the CMM manages the blades using pre-known characteristics and policies of the blades. Furthermore, such blade systems generally use proprietary interfaces between CMM and blades.

DETAILED DESCRIPTION

In various embodiments, heterogeneous computation blades may be supported in a consistent and interoperable manner. In this way, an open blade/rack environment may be realized having heterogeneous blades, at least some of which may be of different OEMs and which may include heterogeneous resources. To effect such interoperability and heterogeneousness, embodiments may provide a negotiation to ascertain and convey policy from a CMM to the blades. In this way, power management and security in a data center may be realized in the presence of heterogeneous resources.

Accordingly, a chassis may include heterogeneous blades of different vendors and different resource capabilities, along with a chassis manager module that can be of yet a different vendor. To manage the various types of blades homogeneously, the CMM may determine the blade characteristics and policies (e.g., blade type, model and power, thermal budget, boot configuration and so forth) before proceeding with complete power-up and initialization of the blade.

To effect initialization of such a blade system, a reduced boot mode may be provided for the blades. Specifically, the reduced boot mode is to provide characteristics and policies of the blades to the chassis manager. In this reduced boot mode, various devices of the blade such as input/output (IO) and other devices may not be powered up and not initialized. Instead, a minimal amount of components of the blades may be initialized. For example, a local area network (LAN) controller and interface may be powered, along with a minimal amount of memory, processor and so forth.

In this reduced boot mode, a blade basic input/output system (BIOS) or firmware may quickly boot-up to a stage or environment in which it can establish a communication with the chassis manager to provide its characteristics and policy information thereto. For example, in various embodiments, such communications may be via a standard interface such as an Intelligent Platform Management Interface (IPMI) communication or otherwise. When the CMM obtains such information, it may process it and determine various policy and configuration information for the blade, such as thermal policy (e.g., enable aggressive passive cooling and disabling of local disk drives) as well as a boot configuration (e.g., boot to a pre-execution environment (PXE), boot to an update environment boot with security enabled, and so forth). The CMM may then provide the determined policy and configuration data to the blade and restart the blade in a normal power mode. When then powered up, the blade BIOS and/or firmware may refer to the boot policy and configuration data received from the chassis manager to initialize the blade and boot accordingly. In various embodiments, the reduced boot mode described above may be used only during an initial boot after a blade is inserted. Thereafter, further restarts may always be in the predetermined normal boot mode.

Figure 1:
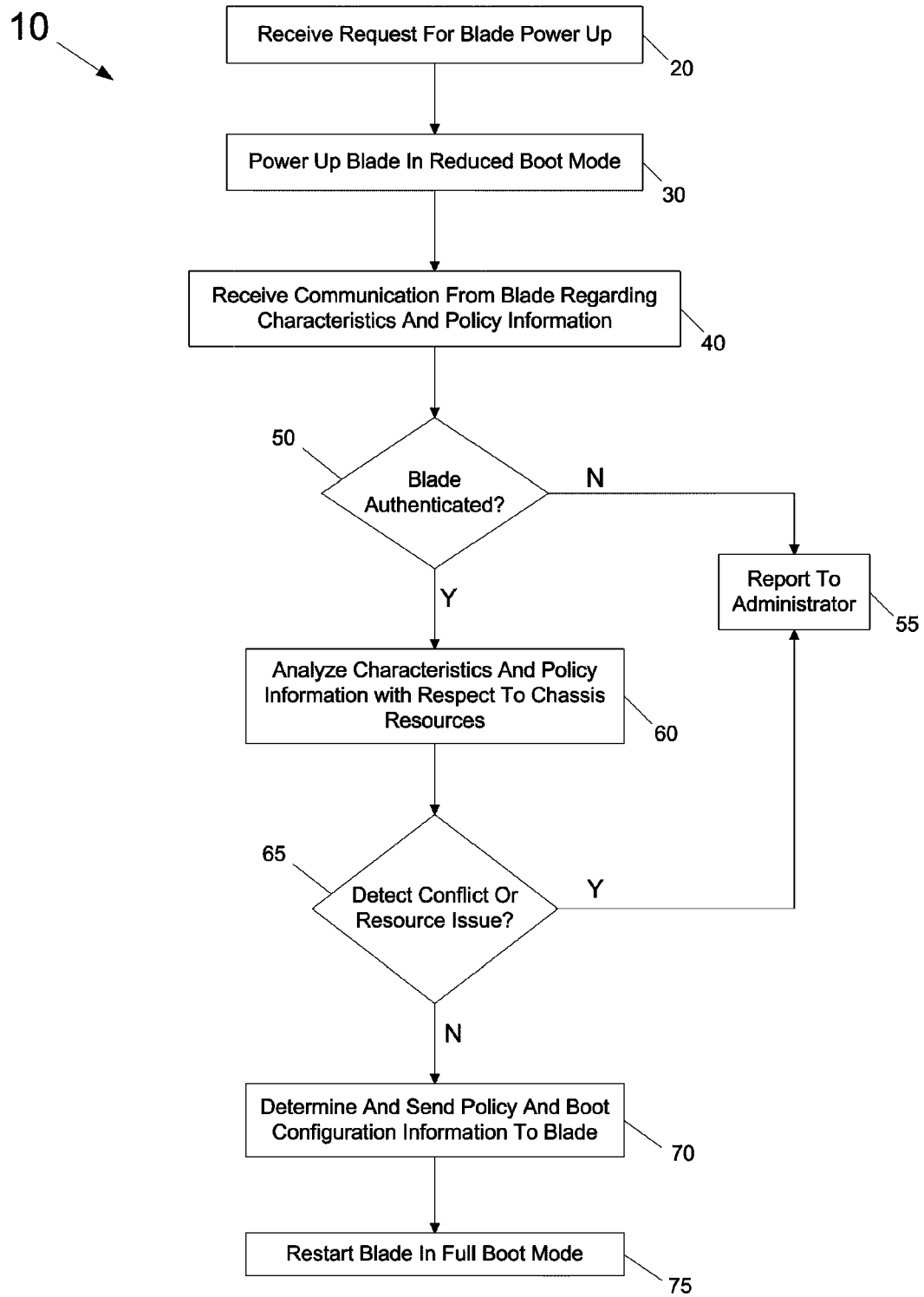
FIG. 1 is a flow diagram of a method in accordance with one embodiment of the present invention.

Referring now to FIG. 1, shown is a flow diagram of a method in accordance with one embodiment of the present invention. Method 10 of FIG. 1 may be performed by a CMM to initiate a reduced boot mode to obtain information from one or more heterogeneous blades within a chassis and to set policy and configuration for the blades. As shown in FIG. 1, method 10 may begin by receiving a request for blade power-up (block 20). For example, when a new blade is inserted into a blade chassis, a power-up may be requested, e.g., via a front panel, remotely or otherwise.

Then, the CMM may initiate power-up of the blade in a reduced boot mode (block 30). As such, the blade may be powered-up with only minimal devices having power. In this way, many IO devices and chip components are not powered. For example, local hard drives, universal serial bus (USB) ports, video controllers, storage and other controllers may not be powered up. Instead, only a minimal amount of memory is powered and initialized, along with a processor, LAN controller or other such communication component. Accordingly, the blade BIOS or firmware boots quickly to a reduced boot environment where the blade can communicate to the chassis manager. The chassis manager may then receive a communication from the blade regarding its characteristics and policy information. While the scope of the present invention is not limited in this regard, these characteristics may include type, model of blade, power and thermal budget requirements and so forth. Note that the reduced boot environment may correspond to an Extensible Firmware Interface (EFI) shell or a mid-point in a power-on self test (POST) in which a chassis manager communication path is initialized and available.

Referring still to FIG. 1, next it may be determined whether the blade is authenticated (diamond 50). If not, a conflict may be reported to an administrator, e.g., remotely (block 55). Note that this step may be optional in some embodiments. Assuming the blade is authenticated, at block 60 the chassis may analyze the characteristics and policy information with regard to chassis resources, for example with regard to power budget, cooling capacity and so forth. Based on this, one or more conflicts or resource issues may be detected (diamond 65). If so, such conflicts may be reported (block 55).

Otherwise, a power-up policy and boot reconfiguration for the blade may be determined and sent to the blade (block 70). For example, the chassis manager may instruct the blade to enable aggressive passive cooling and disable local drives due to a lack of remaining power and thermal resources. Such determination may be based on blade capacity, location in chassis, available rack airflow, and so forth. Alternately, the chassis manager may direct the blade to perform a pre-execution environment (PXE) boot or direct the blade to boot to an update environment such as an EFI shell. Still further, the chassis manager may instruct the blade to enable security policies on boot. Note that this communication to the blade may be by a standard interface such as IPMI or LAN.

Finally, as shown in FIG. 1, the blade may be restarted in full boot mode (block 75). Accordingly, the chassis manager may restart, e.g., by a power-down and power-up process, the blade into a normal boot mode. The blade BIOS firmware may thus refer to the determined policy and configuration set by the chassis manager and follow blade initialization and boot accordingly. While shown with this particular implementation in the embodiment of FIG. 1, the scope of the present invention is not limited in this regard.

Figure 2:
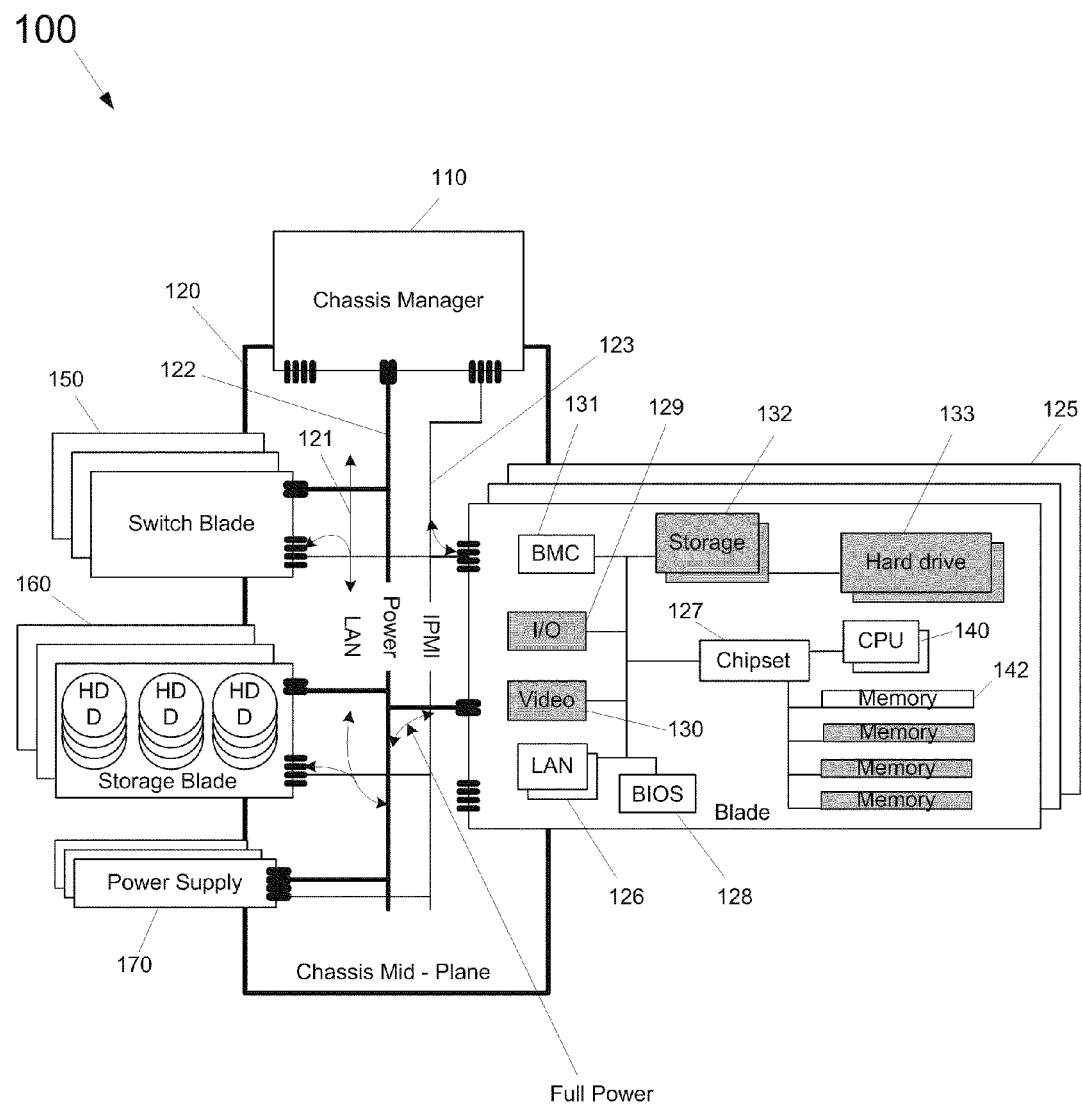
FIG. 2 is a block diagram of a chassis showing a blade in a reduced boot mode in accordance with one embodiment of the present invention.

Referring now to FIG. 2, shown is a block diagram of a chassis showing a blade in a reduced boot mode in accordance with one embodiment of the present invention. As shown in FIG. 2, chassis 100 includes a chassis manager 110 coupled to a chassis mid-plane 120 to which a plurality of blades 125 are coupled (which may be heterogeneous blades), e.g., by LAN connections 121, power connections 122, and IPMI connections 123. For example, one such blade 125 includes a LAN controller 126 coupled to a bus that is coupled to a various computer resources such as a chipset 127, a BIOS storage 128 and other devices such as IO device 129, a video device 130, a baseboard management controller (BMC) 131, storage devices 132, which in turn may be coupled to hard drives 133. In turn, chipset 127 is coupled to a central processing unit (CPU) 140 and plurality of memory modules, only one of which is enabled, namely memory 142, which may be one dual in-line memory module (DIMM) of a plurality of such modules.

In reduced power mode, a minimum amount of power is provided by power connection 122. Thus in this reduced power mode, only certain devices, namely memory 142, CPU 140, chipset 127, BIOS storage 128, LAN controller 126 and BMC 131 are enabled, while the devices that are shaded in FIG. 2 are not powered up.

Note that further shown in FIG. 2 chassis mid-plane 120 may be coupled to a plurality of switch blades 150, a plurality of storage blades 160 and a power supply 170. In the embodiment of FIG. 2, the various blades may include heterogeneous resources and may originate from different vendors. While shown with this particular implementation in the embodiment of FIG. 2, the scope of the present invention is not limited in this regard.

Thus chassis 100 may be an open blade rack with different blades. In one such embodiment, each blade 125 may be associated with a different operating system (OS) for example, of different vendors. Accordingly, various mission-critical OSs having strong isolation between the different OS instances may be realized. Thus, there is no chance of vulnerability in a given blade or CMM to comprise confidentiality of each blade's isolated memory. In this way, rather than virtualized-based server consolidation in which different OS instances are provided using virtual machine monitors on a single blade, each blade may be associated with a different OS such that secure operations, such as secure applications may be run on a single blade having a secure OS, while non-secure applications may be run on a blade having a non-secure OS.

Figure 3:
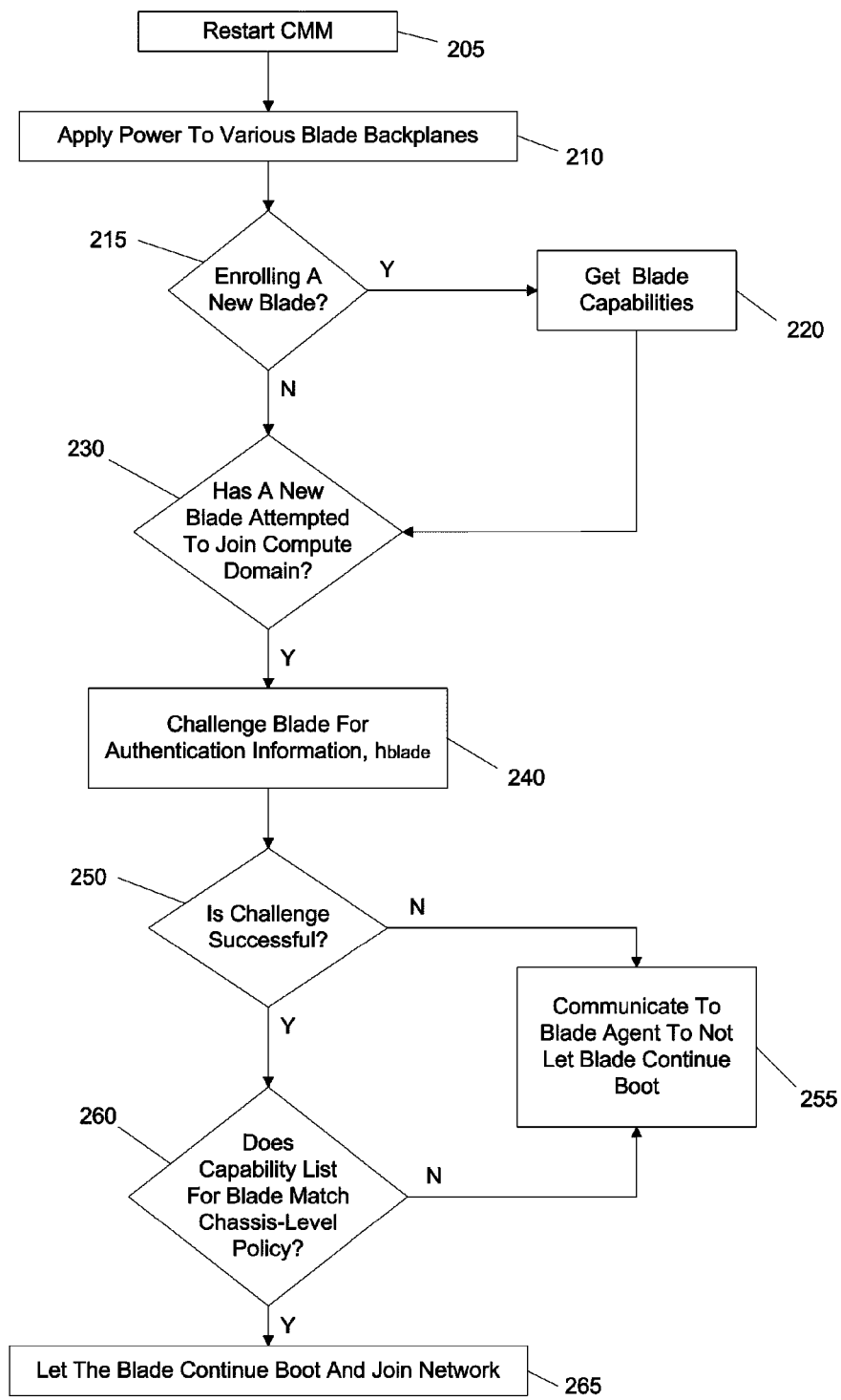
FIG. 3 is a flow diagram of a method in accordance with another embodiment of the present invention.

Referring now to FIG. 3, shown is a flow diagram of a method in accordance with another embodiment of the present invention. As shown in FIG. 3, method 200 may be used to operate a CMM to perform secure enrollment of a blade in accordance with an embodiment of the present invention. As shown in FIG. 3, method 200 may begin by restarting a CMM (block 205). Then power may be applied to various backplanes of the chassis (block 210). Then it may be determined whether a new blade is being enrolled at diamond 215. If so, the blade's capabilities may be obtained at block 220. Control then passes to diamond 230, where it may be determined whether a new blade is attempting to join a compute domain. If so, the blade may be challenged for authentication information (block 240). More specifically, in one embodiment the challenge may be a signature check or computed challenge to a client. That is, the CMM may sign a challenge C, which is encrypted by a public hash ($H_{public}$, C). Then the blade is to decrypt this challenge using a private hash ($H_{private}$, C) and then return the challenge C to the CMM. This proves that the blade has the appropriate secret.

Based on this challenge it may be determined whether the challenge is successful (diamond 250). If not, a communication may be sent from the CMM to the blade agent to not let the blade continue to boot (block 225). If instead the challenge is successful it may be determined whether the capability list for the blade matches the chassis-level policy. If not, control passes again back to block 255. Otherwise, the blade is allowed to continue booting and join the compute domain, i.e., the local network (block 265). While shown with this particular implementation in the embodiment of FIG. 3, the scope of the present invention is not limited in this regard.

Thus in various embodiments a chassis including a CMM and heterogeneous blades may act like a unified system. Still further, a virtualization-based environment may be avoided such that strong hardware isolation is realized to segregate secure and non-secure applications/OSs on different blades of the system.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:
1. A method comprising:
   receiving, in a manager of a chassis having a plurality of blades, a request for power-up of a first blade of the chassis;

enabling the first blade to power-up in a reduced boot mode and receiving a communication from the first blade in the manager;

analyzing characteristic information and policy information associated with the first blade with respect to resources of the chassis and determining a policy and a boot configuration for the first blade based on the analyzing;

communicating the policy and the boot configuration to the first blade, and restarting the first blade to boot into a boot mode indicated by the boot configuration to instruct the first blade to execute trusted applications on the first blade, wherein the first blade includes a secure operating system (OS); and communicating a second policy to a second blade of the chassis to execute untrusted applications on the second blade, wherein the second blade includes an untrusted OS.

2. The method of claim 1, further comprising authenticating the first blade and reporting a conflict to a remote administrator if the conflict is determined.

3. The method of claim 1, wherein communicating the policy is to instruct the first blade to disable at least some components of the first blade based on the resources of the chassis.

4. The method of claim 1, wherein communicating the policy is to instruct the first blade regarding a thermal policy.

5. The method of claim 1, wherein communicating the policy is to instruct the first blade to boot to an update environment boot.

6. The method of claim 1, wherein communicating the policy is to instruct the first blade to consume less than a predetermined threshold of power based on at least one of blade capacity, chassis location or available air flow.

7. The method of claim 1, wherein the first blade is provided with minimal power in the reduced boot mode and a plurality of components of the first blade are disabled in the reduced boot mode.

8. The method of claim 2, wherein authenticating the first blade comprises sending an encrypted challenge request from the manager to the first blade and receiving a decrypted version of the encrypted challenge request from the first blade, wherein the first blade decrypts the encrypted challenge request with a private hash.

9. An article comprising a machine-accessible medium including instructions that when executed cause a system to:

receive, in a manager of a chassis having a plurality of blades, a request for power-up of a first blade of the chassis;

enable the first blade to power-up in a reduced boot mode and receive a communication from the first blade in the manager;

analyze characteristic information and policy information associated with the first blade with respect to resources of the chassis and determine a policy and a boot configuration for the first blade based on the analysis;

communicate the policy and the boot configuration to the first blade, and restart the first blade to boot into a boot mode indicated by the boot configuration; instruct the first blade to execute trusted applications on the first blade, wherein the first blade includes a secure operating system (OS); and instruct a second blade of the chassis to execute untrusted applications on the second blade, wherein the second blade includes an untrusted OS.

10. The article of claim 9, further comprising instructions that when executed cause the system to authenticate the first blade and report a conflict to a remote administrator if the conflict is determined.

11. The article of claim 10, further comprising instructions that when executed cause the system to send an encrypted challenge request from the manager to the first blade and receive a decrypted version of the encrypted challenge request from the first blade, wherein the first blade decrypts the encrypted challenge request with a private hash.

12. The article of claim 9, further comprising instructions that when executed cause the system to communicate the policy to instruct the first blade to disable at least some components of the first blade based on the resources of the chassis and to instruct the first blade regarding a thermal policy.

13. A system comprising:

a plurality of blades, at least one of the blades having heterogeneous resources; and a chassis manager coupled to the plurality of blades, wherein the chassis manager is to determine whether a first blade is being enrolled, and if so, obtain capabilities of the first blade, challenge the first blade for authentication information, receive the authentication information from the first blade and determine whether the challenge is successful, and if so determine whether a capability list for the first blade matches a chassis-level policy, and if so allow the first blade to continue a boot process and to join a network, wherein the first blade is to be provided with minimal power in a reduced boot mode and a plurality of components of the first blade are to be disabled in the reduced boot mode.

14. The system of claim 13, wherein the challenge comprises an encrypted challenge request and the chassis manager is to receive a decrypted version of the encrypted challenge request from the first blade, wherein the first blade is to decrypt the encrypted challenge request with a private hash.

15. The system of claim 14, wherein the chassis manager is to determine if the challenge was successful, and if not to prevent the first blade from continuing a boot process.

16. The system of claim 13, wherein each of the plurality of blades is associated with a different operating system (OS).

17. The system of claim 13, wherein the chassis manager is to communicate a policy and boot configuration to the first blade, the first blade is to boot into a boot mode indicated by the boot configuration, and to execute trusted applications, wherein the first blade includes a secure operating system (OS).

18. The system of claim 17, wherein the chassis manager is to communicate a second policy to a second blade of the chassis to execute untrusted applications on the second blade, wherein the second blade includes an untrusted OS.

* * * * *